United States Patent [19]

Blake, III

[11] Patent Number: 4,680,747

[45] Date of Patent: Jul. 14, 1987

[54] MULTI-MESSAGE PHONOGRAPH SYSTEM

[76] Inventor: Joseph W. Blake, III, 88 Main St., New Canaan, Conn. 06840

[21] Appl. No.: 795,888

[22] Filed: Nov. 7, 1985

[51] Int. Cl.⁴ .......................... G11B 27/00; G11B 3/78
[52] U.S. Cl. ........................................ 369/65; 369/31; 369/67
[58] Field of Search ..................... 369/65, 31, 66, 67

[56] References Cited

U.S. PATENT DOCUMENTS

| | | | |
|---|---|---|---|
| 4,404,667 | 9/1983 | Koike | 369/65 |
| 4,404,668 | 9/1983 | Watanabe | 369/65 |
| 4,447,898 | 5/1984 | Koike | 369/65 |
| 4,541,085 | 9/1985 | Koike | 369/65 |
| 4,574,370 | 3/1986 | Koike | 369/65 |

Primary Examiner—Steven L. Stephan
Attorney, Agent, or Firm—Lackenbach Siegel Marzullo & Aronson

[57] ABSTRACT

A system for selecting a message of a multi-message record for a toy phonograph. A vertical column is movably disposed around a center shaft in a housing. The column carries a turntable with the record at its top end and includes a base portion that has a ringed pressing surface and a cam at the bottom rim. Radial extending arms are positioned in the bottom wall of the housing equal in number to the number of messages on the record; each arm has an upward projection at its inner end that is higher in elevation than the cam of the column in the lower position of the column. The record is slotted to the column so that each message position can be ascertained. Selecting devices including vertical pushbuttons aligned with the starting points for the record messages are rotatably positioned around the base portion of the column. Upon pressure at a selected pushbutton aligned with a selected message position, the selecting device operates to press the column down until the rotating cam of the column trips the selecting device free. The column and turntable are thereupon biased up to engage the record with the stylus of the tone arm at the selected message.

36 Claims, 17 Drawing Figures

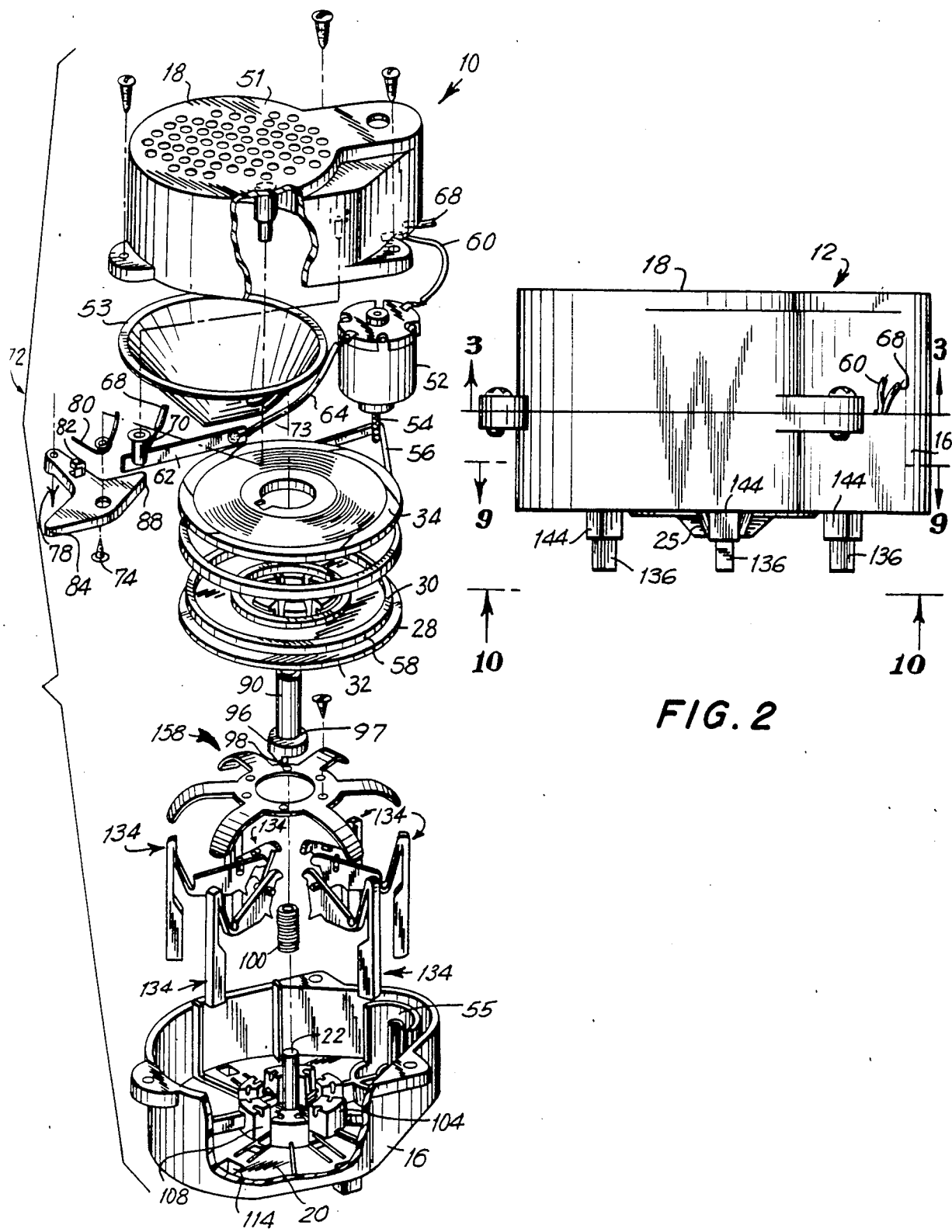

1

MULTI-MESSAGE PHONOGRAPH SYSTEM

This invention relates to a selector system for a mechanical selector system for a sound reproducing phonograph and in particular to a multi-message phonograph of the type having a multi-groove record.

Phonographs intended for use by children often are found in toys such as toy telephones, for example, or in dolls. Several messages on a single record, or disc, are embedded in the toy and a selected message, or tune, can be activated by pressing a push-button or by dialing a number that activates a hidden push-button. The disc is generally relatively small and contains the varied messages in concentric, spiraled grooves cut into the disc. Multi-message phonographs have general commercial applications, such as for giving instructions to a purchaser.

One multi-message phonograph is described in U.S. Pat. No. 3,712,629 issued Jan. 23, 1973 to Watanabe. That invention describes a toy phonograph selecting apparatus that includes a control wheel 24 which is cammed into rotational motion by the depressing of a selected one of control elements, or push-buttons, 4P-4U. The rotating control wheel 24 then urges its arm cam 26 to release the pickup 12 for return of stylus 3 to the periphery of disc (1) by forcing up a press-down arm 20, and (2) starting the motor of the turntable 5. Turntable 5 rotates until its stop 2 runs into the selected control element 4P-4U so that the turntable with its record, or disc, 1 has been turned to a position under stylus 3. At this time, the selected control element 4P-4U is released, the control wheel is sprung back to its original position by a torsion spring 27. Cam 26 is withdrawn from under press-down arm 20 so that the press-down arm presses pickup 12 with the stylus 3 down into the selected starting point $P_1-U_1$ of the selected groove t-u. At the end of the message or tune, pickup 12 separates a movable contact element from electric contact element 11 to stop the operation of the device.

The Watanabe devices employs a protuberance adjacent the outer periphery of a record in which several streaks of sound grooves are formed such that their starting points are positioned equidistantly from each other along the circumferential brim of the record. Control elements corresponding to the respective sound grooves are provided protrudably and retractably in the rotatory passage of the protuberance such that, in operation, any selected one of the control elements is projected within the passage of the protuberance to check the latter so as to accordingly stop rotation of the record, thereby positioning the starting point of the particular sound groove in exact register with the stylus. Thus, it is possible to select and play any desired one of the several tunes recorded on a single disc, such tune selection is achieved by a simple finger operation to let a particular control element project into and retract from the rotary passage of the protuberance.

SUMMARY OF THE INVENTION

Accordingly, it is an object of the present invention to provide a system for selectively activating a multi-message record for playing by a phonograph generally embedded in an object such as a toy or machine.

It is another object of the present invention to provide a reliable and easy to operate multi-message phonograph.

It is yet another object of the present invention to provide a miniature multi-message or multi-tune phonograph that is inexpensive to manufacture, easy to assemble, and reliable in operation.

In order to achieve the above objects, as well as others that will become apparent hereafter, a system is provided for selecting one message of a plurality of messages registered in a plurality of equally spaced concentric spiral grooves on a phonographic record, or disc, and for playing the selected message, each said selected message having a starting point on the periphery area of said disc and a termination point at the center of the disc.

The system includes a housing having walls including a base wall forming a compartment; a shaft having one end perpendicularly secured to the base wall and an opposite end positioned in the compartment; a loudspeaker device mounted in the compartment; a pickup apparatus rotatably secured to the housing and movable in an arc on a pickup plane perpendicular to the shaft, the pickup apparatus being operatively connected to the speaker device; the speaker including a cone having a line or apex which acts to keep the pickup apparatus aligned in the pickup plane; a record apparatus that includes the above-mentioned disc, the record apparatus being axially mounted at the opposite end of the shaft and rotatably movable perpendicular to the shaft, the record apparatus being axially movable relative to the shaft between contact and non-contact positions, wherein in the contact position the disc is in operative contact with the pickup apparatus and in the non-contact position the disc is spaced from the pickup apparatus; the pickup apparatus being movable between the starting point and the termination point of the disc during rotation of the record apparatus in the contact position, the pickup apparatus being positioned at a certain periphery position in preparation for contact with the starting point of the selected message; and an electric motor mounted in the compartment operatively connected to the record apparatus, the motor being for driving the record apparatus. A source of electrical power energizes the motor, an electrical circuit joins the source of power with the motor, and a biasable circuit control device positioned in the circuit is capable of disconnecting the electric circuit upon response to pressure.

The system further includes a plurality of selecting devices equal in number to the number of messages on the disc. Each of the plurality of selecting devices is movable between inactivated and activated positions. Anyone of the selecting devices is capable of being moved from the inactivated position to the activated position to initiate selection of the selected message to be played.

Each of the selecting devices is aligned relative to the starting points of associated messages and to the particular periphery position of the pickup apparatus.

Catch members on the selecting devices are capable of locking onto catch members of flexible arms radially extending in slots around the base wall of the housing in order to hold the record apparatus in the non-contact position.

The electric motor is de-energized by the circuit control device when the pickup apparatus reaches the termination point of the message in the contact position of the record apparatus during rotation of the record apparatus by the motor.

The record apparatus rotates upon reaching its non-contact position with the self-biased contact bar moving to a circuit contact position activating the circuit upon release of contact pressure between the speaker core and the pickup apparatus. A cam at the bottom of the record apparatus releases the lock between the selecting device and the flexible arm so that the record apparatus axially moves to its pressure contact position by way of a coiled compression spring positioned around the shaft between the base wall and the bottom of the record apparatus. This occurs at the starting area of the message on the disc that has been aligned with the selecting device that has been activated. A series of axially extending flat springs connected to the housing and to the selecting devices act to bias the activated selecting device back to its inactivated position once the lock between the selecting device and the associated flexible arm has been released.

The above-mentioned cam is capable of striking all the ramp protrusions at the inner ends of the flexible arms as the record apparatus rotates, but the striking action at the activated selected device acts to press its associated flexible arm to release the lock on the selecting device, thus releasing the record device.

The record apparatus includes a column positioned around and axially movable relative to the shaft. The column has a ring surface that pressing fingers of the selecting devices press upon when a push-button portion of the selecting device is pressed.

BRIEF DESCRIPTION OF THE DRAWINGS

FIG. 1 is an exploded perspective view of the multi-message system according to the present invention;

FIG. 2 is an elevational view of the assembled system;

DESCRIPTION OF A PREFERRED EMBODIMENT

Figure 3:
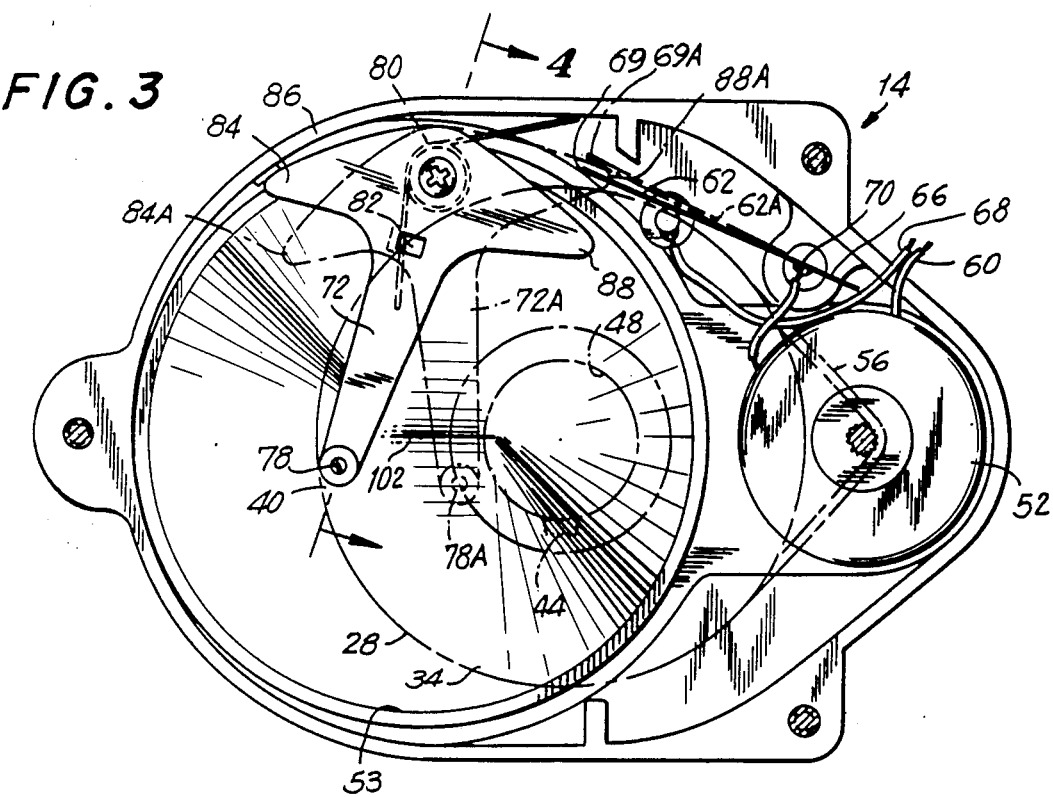
FIG. 3 is a view taken through lines 3—3 of FIG. 3.
Figure 4:
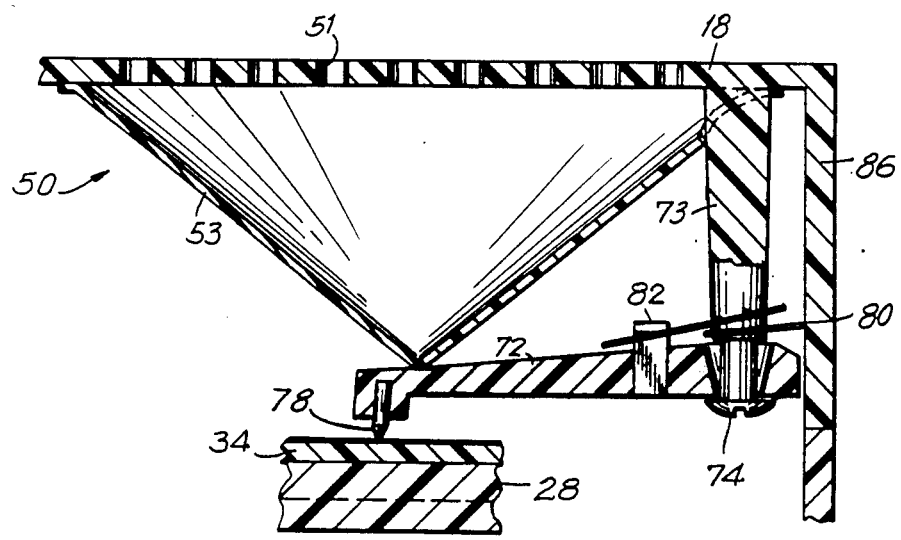
FIG. 4 is a view taken through line 4—4 of FIG. 3.

The invention will now be described in more detail with reference to the drawings.

The embodiment particularly described below and as shown in the drawings is described with the disc, or record, being horizontal for purposes of clarity and ease of exposition. As will be seen, however, the invention can be employed in positions when the record is well off the horizontal and will function equally well at constantly changing positions other than the horizontal.

A multi-message phonograph system 10 is shown in an exploded perspective view in FIG. 1 and in assembled cross-section in FIGS. 5-8. A housing 12 for the invention includes a cover 14 having a horizontal base 16 and top wall 18 having an opposed horizontal bottom wall 20. A shaft 22 is vertically mounted in housing 11; shaft 22 has a lower end 24 secured to bottom wall 20 and at bottom wall base b race 25 and an opposed upper end 26 spaced below top wall 18. A horizontal turntable 28 is mounted in housing 12 at upper end 26 shaft 22 and is rotatably movable about the shaft. Turntable 28 has opposed top and bottom sides 30 and 32 respectively.

A disc, or record, 34 carried at top side 30 of turntable 28 has six concentric, equally spaced spiral message grooves 36 having six equally spaced starting points a,b,c,d,e, and f aligned clockwise around the periphery 40 of record 34 and continuing to central area 42 of the record, where the spirals terminate. Grooves 36 are generally shown and indicated as numeral 36, but it is to be understood that the six grooves 36 include the six grooves that begin with starting points 38a-38f and continue equi-spaced to the termination of each message at central area 42. Six groove messages are shown for purposes of exposition, but it is to be understood that any number of multi-messages can be used with the invention, from two grooves to such number of grooves that is only self-limited by practical considerations; the number could easily be more than the six message grooves shown. Record 34 is secured to turntable 28 by a key-keyway combination 44 with the key jutting radially outwardly from the central, circular mount 46, which is adapted to slidingly receive central circular hole 48 of record 34, with the keyway being formed by the inner rim of the record at central hole 48.

A loudspeaker unit 50 is mounted in housing 12 with the speaker cone 53 positioned in cover 14 and the speaker face 51 formed flush with top wall 18. Speaker cone 53 forms a beveled linear vertex 57. Cone 53 is vacuum formed and is very thin; it is shown relatively thick for purposes of exposition only. An electric motor 52 is mounted in housing 12 alongside speaker unit 50 in cover 14 with its bottom drive 54 connected to a pulley, or drive belt, 56 in turn mounted to pulley wheel 58 formed at the outer rim of turntable 28 in a known manner. Turntable 28 is rotated as motor 52 is activated. An electric circuit electrically connects motor 52 with a source of electrical power. The electrical circuit includes a first conductor, or wire, 60 that connects the motor terminal to the source of electrical power, a self-biased, elongated electrical contact bar 62, a second wire 64 connected to one end 66 of contact bar 62 and to the motor terminal, and a third wire 68 connected to a rigid vertical electrical contact rod 70 and from there leading to the power source so as to complete the electrical circuit. Rigid contact rod 70 is connected at its top end to an extension of cover 14 with its bottom end free.

Self-biased contact bar 62 is secured to another extension of cover 14 at end 66; the opposite end 69 of contact bar 62 is free and is normally self-biased against rigid rod 70 so as to complete the electrical circuit between motor 52 and the electrical power source. Contact bar 62 acts as a circuit control adapted to connect the electrical circuit for motor 52 in its normal unbiased state and to disconnect the electrical circuit upon response to pressure at its free end 69 so as to move it from its electrical contact with rod 70. It is noted that when contact bar 62 is released from the cut side pressure moving it from its non-connecting mode, it self-biases back to its connecting mode with rod 70 without the aid of any external force.

An arm 72 is positioned generally under speaker unit 50 with one end rotatably connected to a projection 73 at the side area of cover 14 at a pivot screw 74 and an opposed free end. Projection 73 extends upwardly through a hole in cone 53 and is connected to speaker unit 50 at speaker face 51. Tone arm 72 is connected to a stylus 78 at the free end of tone arm 72. Arm 72 is moved over a horizontal plane by torsion spring 80 which is braced against the side wall of cover 14 at one prong 81 and against a brace 82 built onto the secured end portion of the tone arm by the other prong. Arm 72 includes a first stop portion 84 that acts to prevent the movement of the tone arm to a point where stylus 78 is positioned at the periphery of record 34. First stop portion 84 is a wing that extends generally transversely to arm 72 at pivot screw 74 and is structured to strike side wall 86 (FIG. 3) of cover 14 when biased by torsion spring 80, with torsion spring 80 bracing itself to its biasing action by action of prong 81 against another portion of side wall 86. At the point just described, and as shown in solid lines in FIG. 3, stylus 78 has been moved to a position of the periphery of record 34. Arm 72 also includes a second stop portion 88 that is capable of limiting the movement of the arm to a point wherein stylus 78 is positioned at the central area of record 34, that is, at the end of spiral grooves 36. Second stop portion 88 is a wing that extends generally transversely to arm 72 directly opposite first stop portion 84 and is structured to strike free end 69 when the arm completes its spiral movement along the selected groove of spiral grooves 36, that is, when stylus 78 has reached central area 42. The striking of free end 69 by second stop portion 88 results in free end 69 being pressed away from electrical contact with contact rod 70 so that the electrical circuit between motor 52 and the outside power source is disconnected with the result that motor 52 ceases to rotate drive 54 and pulley belt 56 and the rotation of record 34 ceases. A discussion of the inward spiral movement of arm 72 and stylus 78 will be set forth below. It is noted that prong 81 causes torsion spring 80 to bias arm 72 back to its generally unbiased position wherein stylus 78 is situated at periphery area 40 of record 34. The unbiased mode of arm 72 is shown in FIG. 3 in solid lines, and the biased mode of arm 72 is shown in phantom lines with the arm being shown as 72a, first stop portion as 84a, second stop portion as 88a, and the stylus as 78a. It is noted that the top of arm 72 slides along beveled linear vertex 57 of the body of loudspeaker unit 50 as seen best in FIGS. 5-8 so that the arm is repressed downwards during the movement of the arm during its inward movement to keep the tone arm from being moved upwards and in keeping stylus 78 firmly seated in the selected groove of grooves 36.

It is to be noted that system 10 can therefore be used when record 34 is tilted away from the horizontal. Also, record 34 is locked to turntable 28 at keyway 44 so that the record cannot slip from gripping contact during tilting. Finally, although in the embodiment being described, record 34 and turntable 28 are separate units, they can in fact be one unit.

Figure 14:
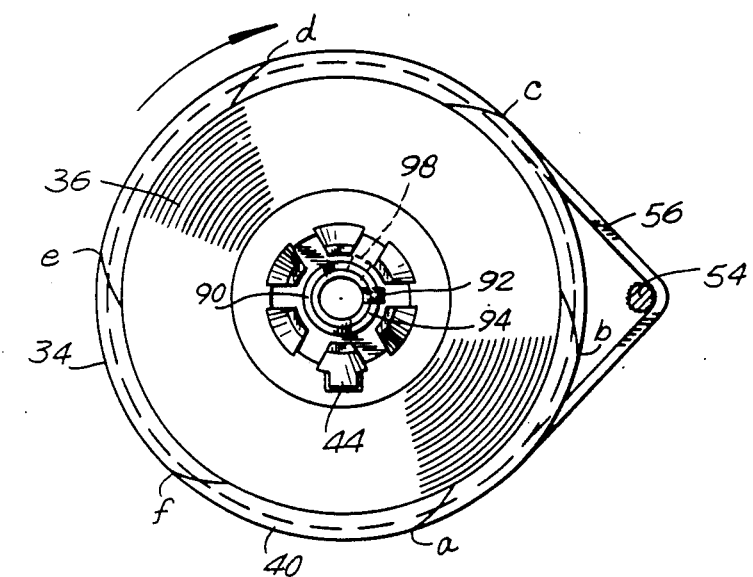
FIG. 14 is an isolated top view of the record fitted on top of the turntable.

A cylindrical column 90 is mounted around shaft 22 and is slidably movable thereabouts between upper and lower positions, which will be more exactly described below. Column 90 has an upper portion that is slidable axially mounted in a central aperture formed at the center of turntable 28. A horizontal keeper screw 92 extends through a central mount 94 of turntable 28 and presses upon the upper portion of column 90 so as to keep turntable 28 and column 90 locked together along with record 34 via key lock 44 which is keyed to turntable 28. Column 90 also includes a cylindrical base portion 96 of greater diameter than the upper portion of the column with a horizontal upwardly facing ring 97 extending outwardly around the lower portion of column 90. Base portion 91 has a lower rim that has extending downwardly from it a ramped cam 98 which is aligned with any of the starting point areas associated with the six starting points a-f, of spiral grooves 36, that is, the eareas between the starting points. The starting point area for starting point a would be between starting a and starting point b, for example, when record 34 is rotated clockwise when the record is viewed downwardly as shown in FIG. 14. The ramp of cam 98 is so aligned with the direction of rotation of turntable 26 that the ramp leads with the rotational movement. Cam 98 is preferably aligned with key/keyway 44 of turntable 28 and record 34.

Column 90 is biased upwardly by a coil compression spring 100 positioned around shaft 22 between bottom wall 20 of housing 12 and base portion 96 of the column. Base portion 96 forms a cylindrical receptacle or cavity 100 adapted to receive the upper end of coil spring 100. Spring 100 exerts upward bias not only upon column 90, but also upon turntable 28 because of their being connected together at keeper screw 92. This pressure is exerted in the upper position of column 90 where such pressure is transmitted to record 34 which in turn exerts pressure against stylus 78 so that the stylus is pressed into the selected groove of grooves 36 and rides the selected groove while picking up the undulations of the groove during rotational movement of the stylus from peripheral area 40 to central area 42. When turntable 28 is biased into its upward mode by spring 100, it presses record 34 against stylus 78 so that arm 72 is pressed against beveled linear vertex 57 as described previously and as shown in FIGS. 5-8 and the stylus is locked into the selected sound grooves. A resisting pressure against the upward bias of coil spring 100 when column 90 is in its upward mode is provided by a horizontal slide edge surface 102 configured by the bottom of speaker cone 53. Slide surface 102 is linear and extends over arm 72 slightly spaced from stylus 78 over the distance that arm 72 makes between its peripheral location and central location with reference to stylus 78 so that the tone arm and the stylus are kept in positive contact in the selected groove of spiral grooves 36 during the playing of record 34.

Column 90, although described as being a separate unit from turntable 28, can be in fact made as one unit with turntable 28. Also, column 90, turntable 28 and record 34 can be made as a unitary piece.

A ring-shaped support structure 104 having a horizontal top side extends upwardly from bottom wall 20 of housing 12 and forms a cylindrical cavity 106 axially aligned with main shaft 22. Support structure 104, because of cavity 106, is spaced from column 90. Support structure 104 forms six equally spaced radial slots 108 that extend outwardly from cavity 106 and open along the entire top side of structure 104. Six pairs of pivot recesses 110 are formed at the top side of structure 104 at each of slots 108. Cylindrical cavity 106 is adapted to receive base portion 96 of column 90. It is noted that the number of slots 108 equals the number of spiral grooves 36.

Bottom wall 20 of housing 12 forms six radial bottom slots 112 aligned with six radial slots 108. Bottom wall 20 also forms a plurality of holes 114 spaced radially outwardly from each of bottom slots 112. Six flexible arms 116 positioned in bottom slots 112 have radially sligned inner and outer ends. The outer ends are secured to bottom wall 20 and the inner ends are movable in bottom slots 112. Each of arms 116 has an upwardly extending ramped projection 122 at its inner end and a catch member 124 spaced radially outwardly from the inner end. Each ramped projection 122 is disposed at a higher elevation than ramped cam 98 of column 90 when the column is in its lowered mode. Arms 116 are movable in their bottom slots 112 between an unflexed, or horizontal, position and a flexed position wherein the inner end along with its ramped projection 122 are disposed below the prior horizontal plane and generally below the plane of bottom wall 20 of housing 12.

As seen in FIG. 10 and FIGS. 5–8, six flat springs 126 are secured to a ring support 128 that is secured to bottom wall 20. Ring support 128 is extended over outer ends 120 of arms 116 just radially inwards of holes 114 and is secured to bottom wall 20 between outer ends 120 by a means known in the art such as heat bonding, as shown, or gluing. Flat springs 126 extend directly under flexible arms 116 and have radially inward free ends 130 generally aligned with outer ends 120 of arms 116. Flat springs 126 move downward under downward pressure at free ends 130 by free inner ends 118 of arms 116. As will be seen later, only one arm 116 and one flat spring 126 will be moved to a downward position at any one time. Flat springs 126 are adapted to bias upwardly against arms 116 so as to keep arms 116 in a generally horizontal position and in particular to move a flexed arm 116 to a horizontal position. Flat springs 126 are preferably made of metal.

Six multi-purpose selecting devices, or elements, 134 each unitary in construction are disposed in association with six radial slots 108 of support structure 104. In particular, as shown in FIGS. 5–8, each element 134 includes a vertical push-button 136, an elongated rocker-arm 138 that extends radially from the area of shaft 22 in a generally horizontal disposition, and a flexible, flat joining strand 140 that extends downwardly from the top of the inner portion of push-button 136 to a shoulder 142 where strand 140 joins the outer end of rocker-arm 138.

Figure 5:
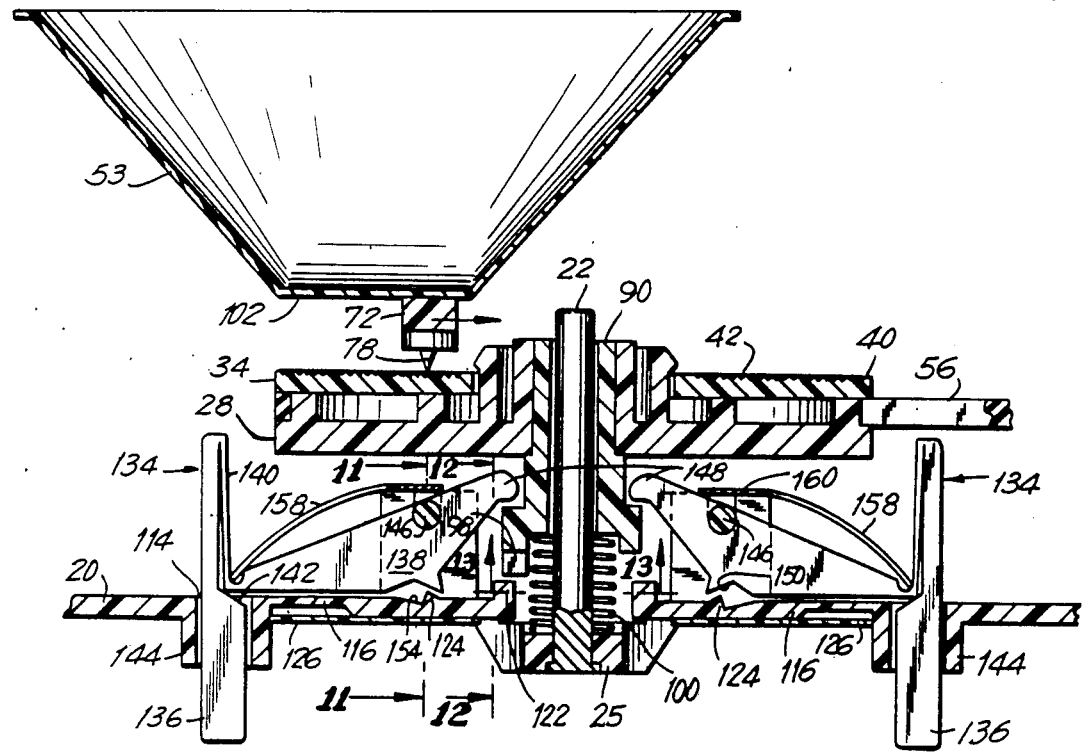
FIG. 5 is a sectional view with the system at rest after completion of a message.

Push-buttons 136 extend downwardly through holes 114 in bottom wall 20. Each hole 114 is provided with a chute 144 that extends downwardly from around hole 114 from bottom wall 20 so as to provide vertical support for push-button 136 as it is moved vertically during operation. The bottom portions of push-buttons 136 extend below chutes 144. Elongated rocker-arms 138 are set in radial slots 108 of support structure 104 and each rocker-arm is provided with a pair of transverse pivots 146 that are set into pivot recesses 110 of support structure 104 so that rocker-arms 138 are rotatable lengthwise about pivots 146. Mcre particularly, as seen in FIG. 5, each rocker-arm 138 has an inner end that forms a pressing finger 148 disposed above ring 97 of column 90. Each rocker-arm 138 is aligned directly above an arm 116. Each rocker-arm 138 also forms a pawl, or latch member, 150 on the underside of the rocker-arm positioned radially inwardly from catch member 124 of arm 116 as seen in FIG. 5. Catch member 124 as seen in profile in FIGS. 5–8 includes an upwardly extending transverse projection 152 that is ramped towards shaft 22 and a transverse pocket 154 on the outer side of the ramped projection relative to shaft 22. Each pawl, or latch member, 150, as seen in FIGS. 5–8, includes a downwardly extending transverse projection that is sharply ramped to a transverse tip on both the inward outwards sides relative to shaft 22 with the tip of the latch member adapted to be held in position in pocket 154.

Elements 134 are rotatably movable about pivots 146 between first and second positions. In the first position as seen in FIG. 5, push-buttons 136 are spaced relatively distantly below bottom wall 20, pressing fingers 148 are spaced above ring 97 of column 90, which is in its upper position as shown in FIG. 5 so that coil spring presses column 90, turntable 28, and record 34 against styles 78, and latch members 150 are out of contact with catch members 124.

Figure 7:
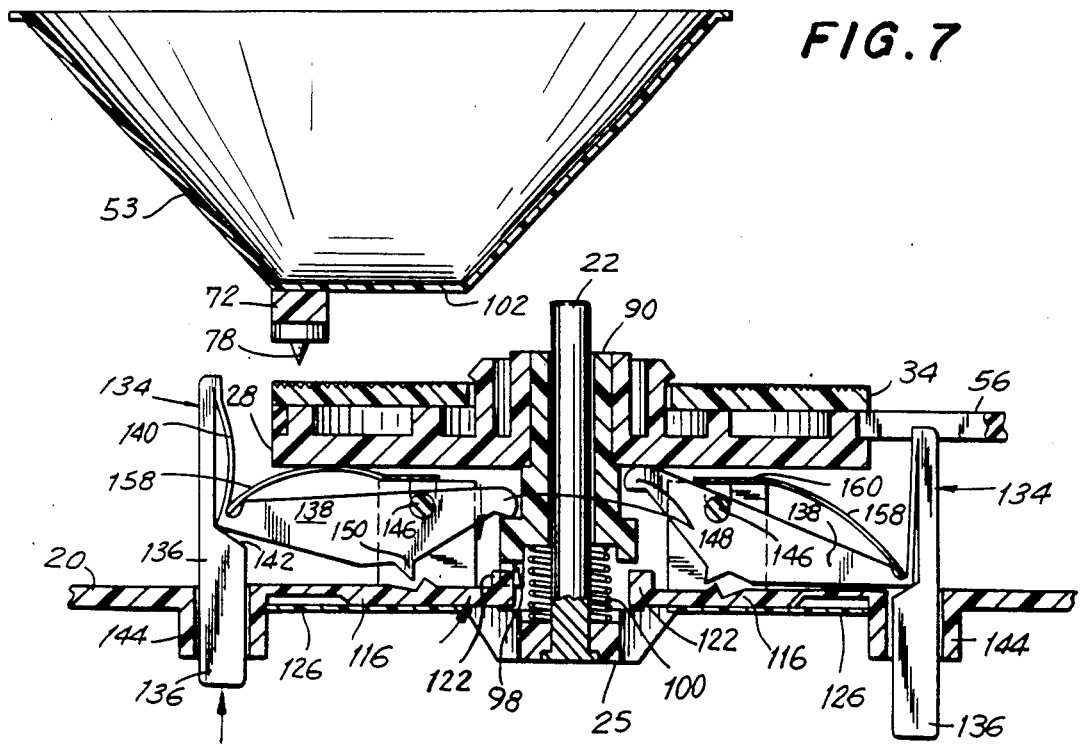
FIG. 7 is a sectional view similar to FIG. 6 showing the push-button having reached its fully depressed position but with the catch member of the multi-purpose element not having yet locked into the catch member of the bottom flexible arm and the tone arm having reached its peripheral position.
Figure 8:
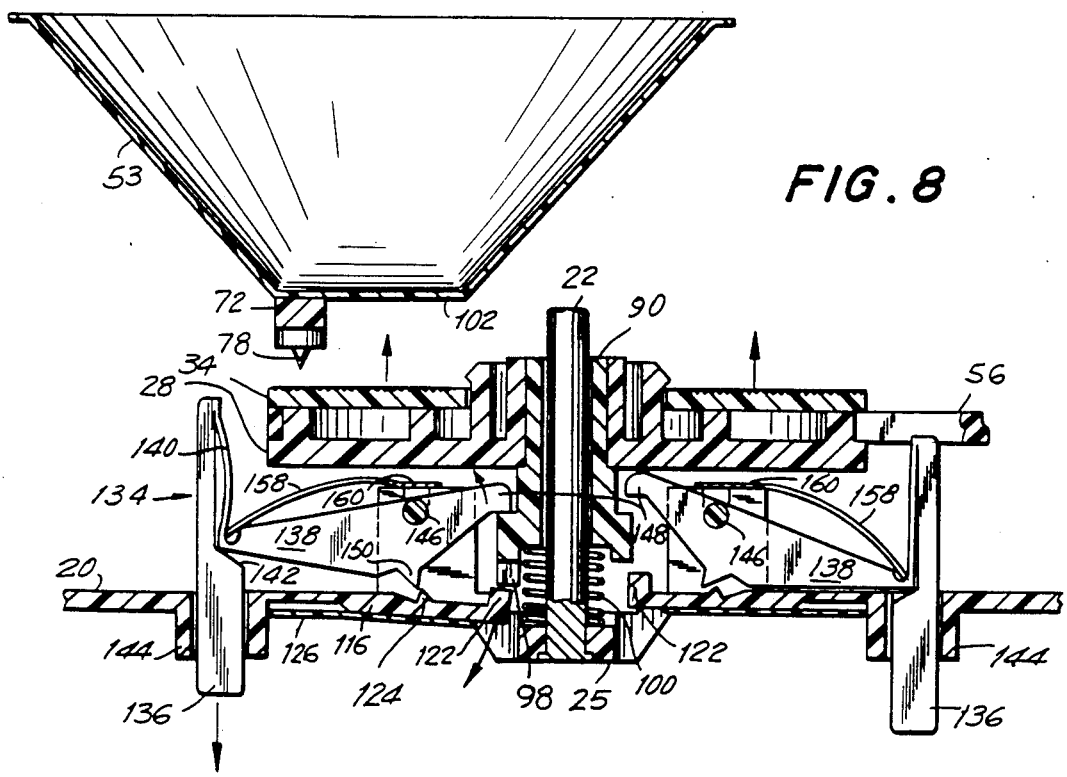
FIG. 8 is a sectional view similar to FIG. 7 showing the ramped cam of the center column camming the ramped projection of the bottom arm downwards.
Figure 9:
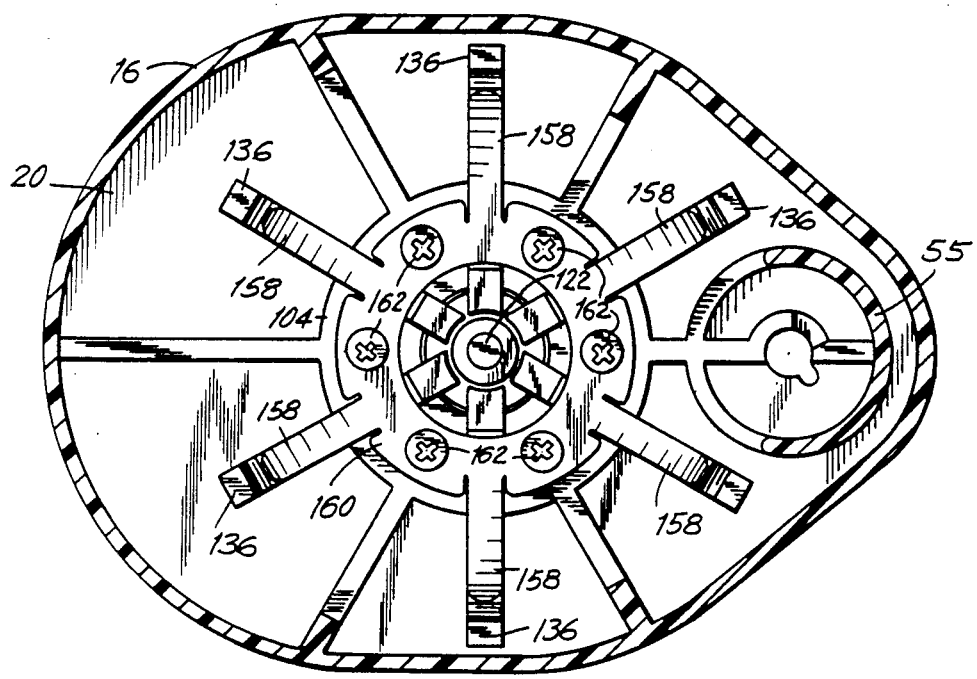
FIG. 9 is a view taken through line 9—9 of FIG. 2.
Figure 10:
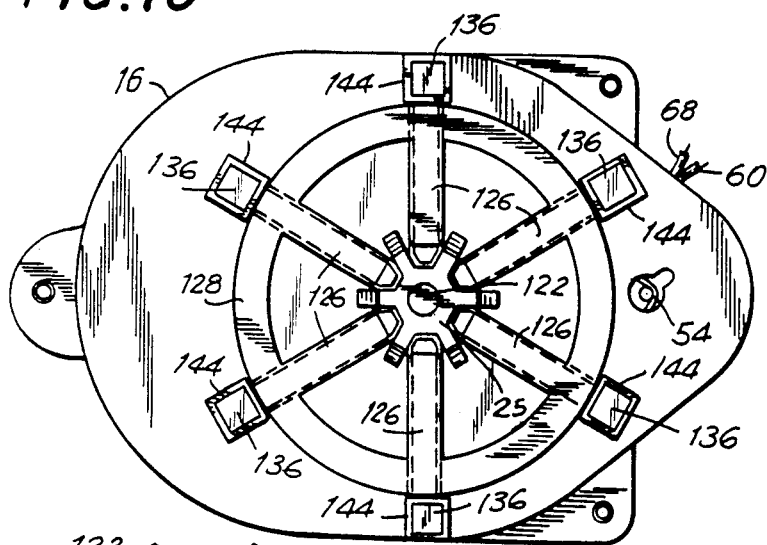
FIG. 10 is a view taken through line 10—10 of FIG. 2.
Figure 11:
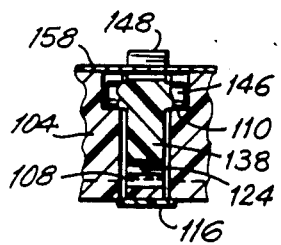
FIG. 11 is a view taken through line 11—11 of FIG. 5.
Figure 13:
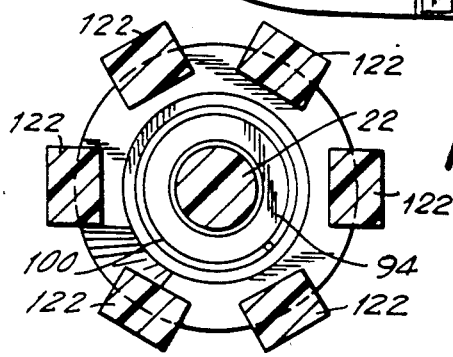
FIG. 13 is a view taken through line 13—13 of FIG. 5.

Integral to the movement of an element 134 from the first position to the second position is a multiple-armed flat spring seen best in FIG. 9 having six separate flat springs 158 radially extending outwardly from a flat connector ring 160 that is secure to the top of base structures 104 by six screws 162. As seen in FIGS. 5–8, flat springs 158 bend upwardly from said ring 160 to a higher elevation at their radial center areas and then downwards at the radially outward ends into pockets formed at the bottom of push-buttons 136 and the outer ends of rocker-arms 138 so as to bias rocker-arms 138 downwardly at their outward ends so as to pull push-buttons 136 downwards via joining strands 140. Flat springs 158 also tend to keep elements 134 in the first position by reason of the downwards bias force. Flat springs 158 extend radially outwardly from connecting ring 160 to strands 140 at shoulders 142 of push-buttons 136. The center areas are disposed between connector ring 160 and shoulders 140 on a plane perpendicular to shaft 22 nearer to disc 34 than the perpendicular plane of connector ring 160 and shoulders 142. Each flat spring 158 is unbiased when an associated element 134 is in an inactivated position and is biased when the element 134 is in the activated position.

A selected element 134 is in its second position when its push-button 136 has been raised relative to bottom wall 20 of housing 12, pressing finger 148 is in downward pressing contact upon ring 97 of column 90 so as to position column 90 along with turntable 28 in their lower positions, and latch member 150 is in latching relationship with catch member 124 of the associated flexible arm 116 aligned with the selected element 134.

Figure 15:
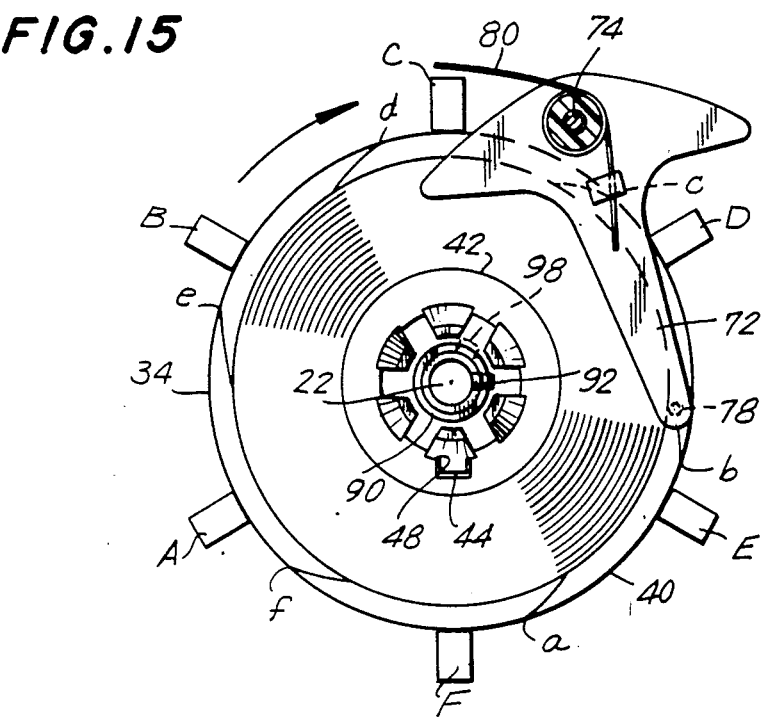
FIG. 15 is an isolated schematic view showing the placement scheme for the push-buttons relative to the starting points of the message grooves.

FIG. 14 shows a top view of the record 34 with turntable 28 and FIG. 15 shows a schematic top view of record 34 with arm 72, pivot 74, and stylus 78 shown in relation to starting points a,b,c,d,e, and f and with push-buttons 136 marked as A,B,C,D,E, and F in relation to the starting points. The markings would in fact be on the underside of bottom wall 20 but are indicated in the top view for purposes of exposition. When turntable 28 is rotated clockwise as seen looking down upon record 34, the push-button selected for activation, which in FIG. 15 will be push-button B, will be locked onto an associated bottom arm 116 via a latch member 150 at a catch member 124. When ramped cam 98 strikes ramped projection 122 of the associated arm 116, column 90 with turntable 28 and record 34 will be released for upward biased movement by coil spring 100 as described previously so that stylus 78 will meet record 34 at the starting area for starting point b that is, generally midway between starting points a and b, that is, in an area directly forward of starting point b relative to the direction of motion of record 34. Buttons A,B, C,D,E and F are positioned in the illustration with push-button D positioned aligned with stylus 78 at the peripheral position midway between starting points a and b with the push-buttons aligned clockwise in equally spaced disposition.

Figure 6:
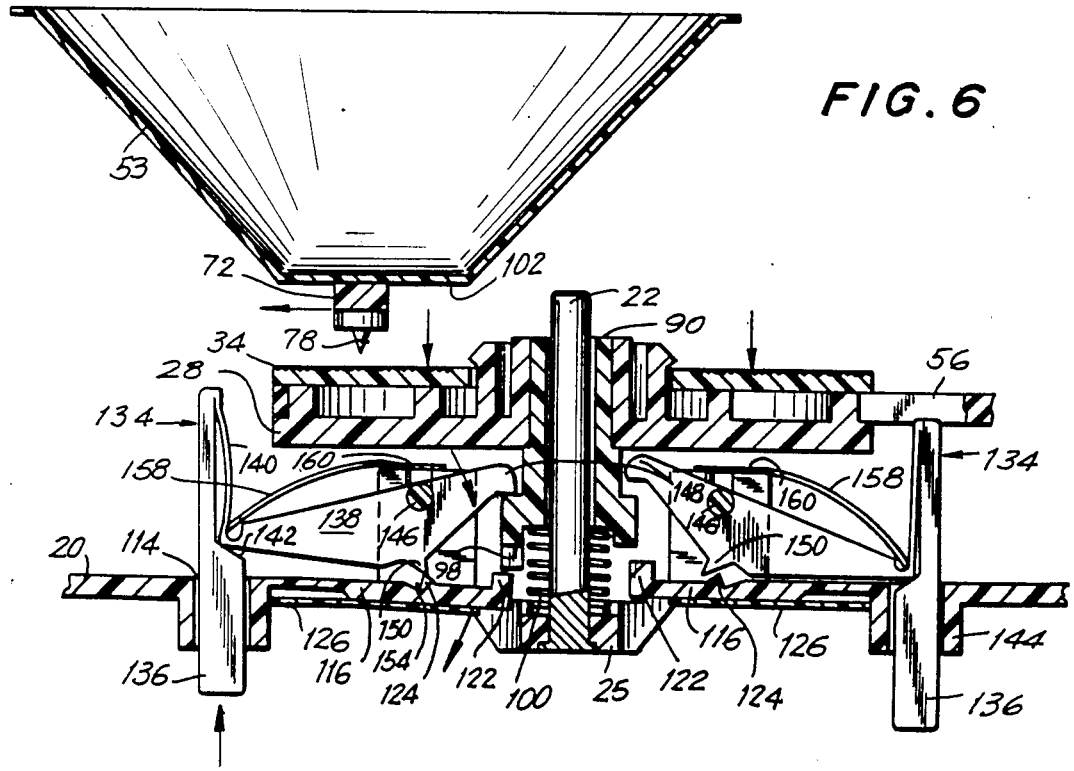
FIG. 6 is a sectional view similar to FIG. 5 showing one of the push-buttons being activated and the tone arm partially returned to its peripheral position.
Figure 12:
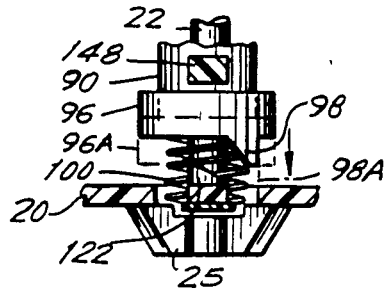
FIG. 12 is a view taken through line 12—12 of FIG. 5.

An operational sequence of the system generally illustrated in FIGS. 5–8 and with reference to FIG. 12 is as follows. An operator first selects the message to be played, then presses the push-button 136 associated with that message. In the sequence of FIGS. 5–8 the push-button disposed to the left of the system is selected for purposes of exposition. In FIG. 5, when turntable 28 and record 34 are in their upper positions described earlier, stylus 78 has ceased to move upon termination of a message at center area 42 of record 34, motor 52 has been de-energized, the electrical circuit has been disconnected by action of second stop 88 having pressed contact bar 62 from contact rod 70, and the bias action of coil spring 100 keeps record 34 pressing upwardly against stylus 78 and thus tone arm 72 against slide surface 102 of speaker cone 53 so as to keep stylus 78 in its groove with sufficient force to prevent biased torsion spring 80 from moving from its biased mode to its unbiased mode. FIG. 6 illustrates the start of the activation of the selected push-button 136 by an operator. Here, pressing finger 148 is beginning to press down upon ring 97 of column 90 and so to press column 90 downwards against the bias of coil spring 100 so as to cause turntable 28 and record 34 like wise to lower. Shoulder 142 of push-button 136 is pressing the radially outer end of rocker-arm 138 to move upwards which action rotates the rocker-arm about pivot 146 so as to rotate pressing finger 148 downwards against ring 97. In addition, the downward pressure of latch member 150 against catch member 124 causes the aligned flexible arm 116 to be pressed downwards against the bias of the associated flat spring 126 which also is pressed downwards. Because record 34 is withdrawn from stylus 78, torsion spring 80 is released from its biased mode and in the process of moving to its relatively unbiased mode carries tone arm 72 along with it from central area 42 to periphery area 40. This movement, as seen in FIG. 3, frees self-biased contact bar 62 to move from its position shown in phantom line shown as 62a to the fully retracted position 62 shown in FIG. 7 shown in solid line. Likewise, free end 88 of the contact bar moves from position 88a to 88, and the tone arm from position 72a to 72, and the stylus from position 78a to 78. As the movement continues to that shown in FIG. 7, the second stop moves from position 84a to 84 where the tone arm stops its retraction. It is noted that motor 52 continues to rotate turntable 28 even after tone arm 72 has been retracted to its starting position.

FIG. 7 shows latch member 150 having passed the projection of catch member 124 so that flexible arm 116 has been biased upwards to its original horizontal position by the associated flat spring 126 which also has returned to its unbiased mode from its biased mode. Push-button 136 is indicated as having moved further upwards so as to complete the pivoting motion of rocker arm 138 about pivot 146. The subsequent movement of latch member 150 into the pocket of catch member 124 follows immediately; this action locks element 134 and the associated arm 116 into the second position previously described and further locks column 90 along with turntable 28 and record 34 into the lower positions also described earlier.

Before proceeding to a description of FIG. 8, the movement preceding the action shown in FIG. 8 will be set forth. As noted above, motor 52 continues to be energized and so to continue to rotate turntable 28 along with column 22, which is locked to the turntable. Ramped projections 122 which extend upwardly are positioned at a higher elevation than ramped cam 98, a disposition that is indicated in the detail shown in FIG. 12, where the upper position of column 90, base portion 96, and cam 98 and the lower positions of the base portion and the cam are shown in phantom lines and indicated as 96a and 98a, respectively. FIG. 12 shows that in the lower position of column 90, cam 98a will successively press down each ramped projection 122 with no reaction until the ramped projection 122 associated with the activated element 134 is encountered. At this point, that particular ramped projection 122 is pressed down so as to free latch member 150 from catch member 124 and thus to release rocker-arm 138 to be rotatably biased upwardly at pressing finger 148 by the upward movement of coil spring 100 moving from its biased mode to its relatively unbiased mode, that is, ring 97 presses finger 148 upwards and causes push-button 136 to be pushed down in channel 144 to its first position. Another result of the upward bias of coil spring 100 is to lift turntable 28 and so record 34 into engagement with stylus 78. It is particularly noted that stylus 78 is not engaged with record 34 until record 34 has been rotated to a position that had been selected by the operator, namely, at the position corresponding to the particular push-button 136 selected for operation. Each of the six push-buttons 136 is aligned with the starting area of the starting points a-e of the desired message groove to be picked up by stylus 78 to be relayed to speaker 50. Stylus 78 rides in the particular groove 36 as record 34 is turned via motor 52 until the end of the message groove is reached, contact bar 62 is disconnected from connecting rod 70, motor 52 is de-energized, and the process awaits to begin once again at the selection of another message by activation of a selected push-button 136.

As stated above, system 10 can be oriented in any position, even upside down from the position shown in the drawings, and operate in the same manner as described herein.

Figure 16:
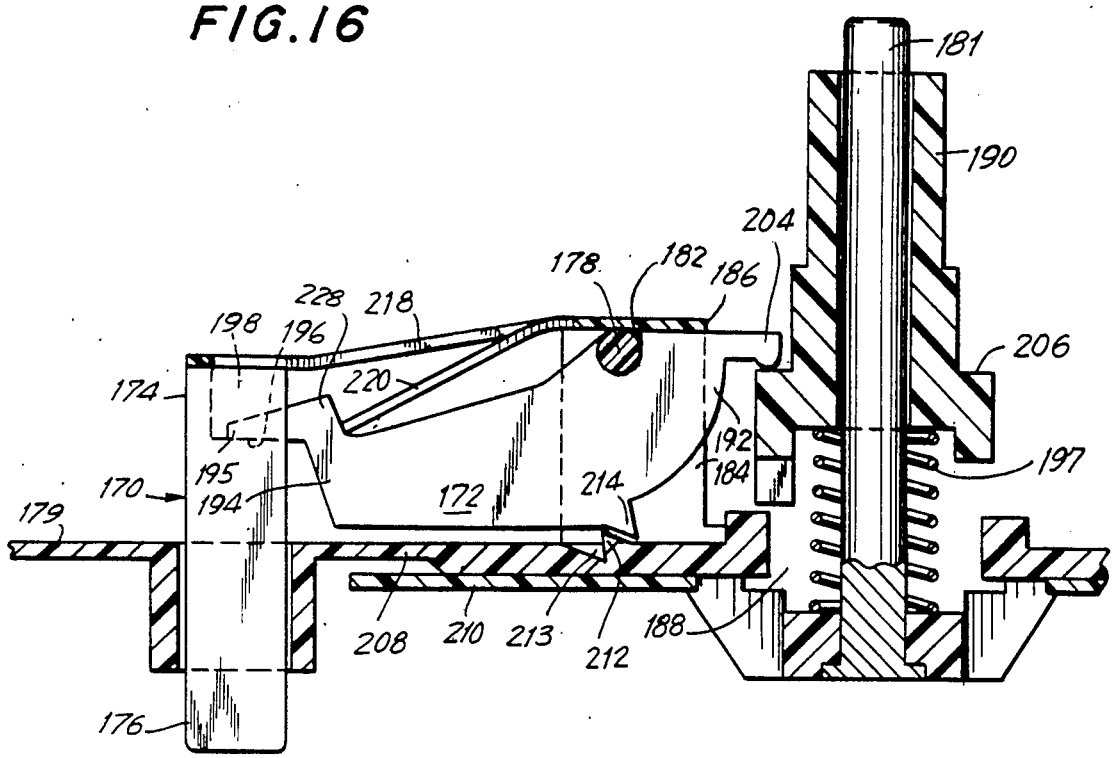
FIG. 16 is a side sectional view of an alternative embodiment of the invention analagous to the view shown in FIG. 5.

An alternate embodiment of the invention relating to the six unitary selecting devices, or elements, 134, particularly push-buttons 136 and rocker-arms 138, and the six flat springs 158 that extend radially outwardly from the flat connector ring 160 as shown in FIGS. 1–15 are shown in FIGS. 15 and 16.

Six selecting devices, namely, six paired first and second elements, or push-buttons represented in FIGS. 15 and 16 by rocker-arms 172, respectively, are each operatively cooperatively associated. Push-button 170 has opposed inner and outer portions 174 and 176, respectively, disposed in a housing analagous to housing 12 of FIGS. 1-15 and outer portions 176 spaced outwardly from a bottom wall 179. Each push-button 170 is movable generally parallel to a central shaft 181 analagous to shaft 12 of FIGS. 1-15. Push-buttons 170 extend through six holes spaced radially outwardly from shaft 181 are operationally available to a user by pressing outer portions 176 towards bottom wall 179. Push-button 170 is movable parallel to shaft 181.

Rocker-arm 172 is rotatable about opposed pivots 178 in a radial slot (not shown) analagous to one of radial slots 108 of FIGS. 1-14 formed by support structure 184 analagous to support structure 109. Pivots 178 are positioned in pivot recesses 182 formed at the planar inner sides 186 of support structure 184 at both sides of each of the radial slots. Support structure 184 forms a central cavity 188 axially aligned with and spaced around a vertically movable column 190 set around shaft 181; cavity 188 receives the base of a vertically movable column 190. Each rocker-arm 172 has opposed inner and outer portions 192 and 194. Rocker-arms 170 are radially disposed round shaft 181 at equal intervals in the radial slots previously mentioned. Outer portion 194 forms a pressing finger 195 that is capable of pressing the base of column 190 downwards against the upward bias of spring 197 encircling shaft 181.

Push-bottom 170 forms a shoulder 196 at inner portion 174. Outer portion 194 of rocker-arm 172 is positioned in contact with shoulder 196. Inner portion 174 of each push-button 170 forms a channel 198 defined by an outer wall 200, a pair of opposed side walls 202 connected to outer wall 200, and shoulder 196. Channel 198 has an inner open side opposite outer wall 200 so that a pressing finger 204 formed at the tip of outer portion 194 of each rocker-arm 172 slidably fits into each channel 198 and rests on each shoulder 196 in non-pressing contact in the non-activated mode of the rocker-arm shown in FIGS. 15 and 16.

Rocker-arm 172 includes another pressing finger 204 at inner portion 192 that is axially spaced from the ring face 206 of the base of column 190 in the non-activated mode of the rocker-arm and is in pressing contact upon ring face 206 in the activated mode of the rocker-arm.

The embodiment shown in FIGS. 15 and 16 is positioned in an environment generally analagous to that discussed for FIGS. 1-15. Six flexible arms such as flexible arms 208 positioned in slots(not shown) are analagous to and operate in the same manner as flexible arms 116 of FIGS. 1-15. The same observation applies to radial flat spring 210, which is analagous to flat springs 126 of FIGS. 1-15. Flexible arm 208 has a ramped projection(seen best by analogy in FIG. 12) in contact with column 190 in the activated rocker-arm mode at its radial inner end and a catch member 212 spaced outwardly from the inner end into the housing. Catch member 212 forms a radially outward pocket 213.

Each rocker-arm 172 includes a latch member 214 extending downwardly toward flexible arm 208 capable of being positioned in pocket 213. Latch 214 is analagous to latch member 150 of FIGS. 1-15 as is catch member 212 analagous to catch member 124; interoperation of these members 212 and 214 is described in detail earlier with regard to members 124 and 150.

Figure 17:
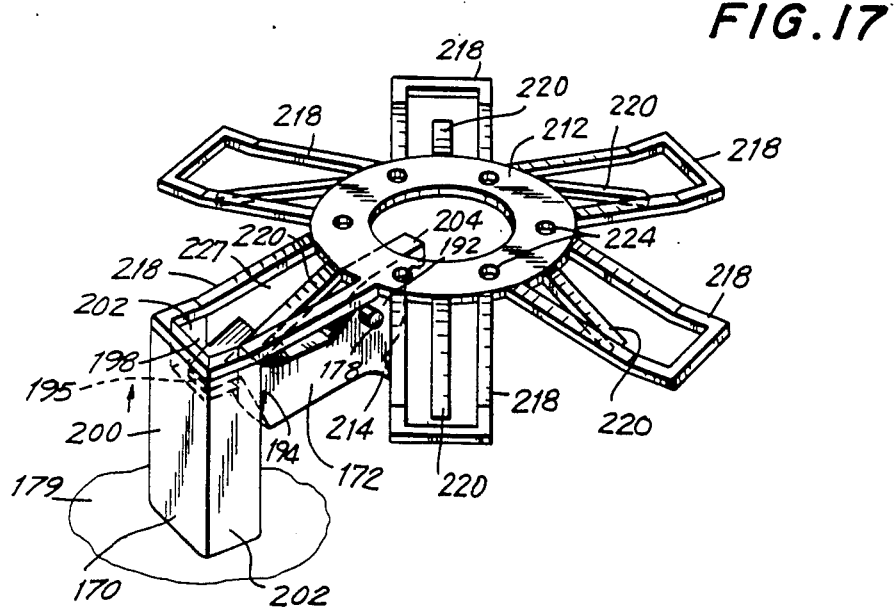
FIG. 17 is an isolated perspective view of portions of the alternative embodiment shown in FIG. 16.

A pair of associated flat biasing springs 218 and 220 represent six pairs of biasing springs seen in FIG. 17 that are adapted to move associated push-buttons 170 and rocker-arms 172 from an activated position to an inactivated position upon release of latch member 150 from pocket 213. Both biasing springs are connected to a flat connector ring 222, which is screwed to planar inward side 186 of support structure 184 at screw holes 224.

Each flat spring 220 extends from connector ring 222 to each push-button 170. Push-button 170 has a U-rim at the top of its channel 198, and flat spring 220 has an outer end from connector ring 222 contoured to a U-strip in contact with the U-rim of channel 198. Each U-strip 226 forms an elongated aperture 227 with connector ring 222.

Each rocker-arm 172 forms an outer shoulder 228 spaced radially inwardly from outer pressing finger 195. Flat spring 22 is a single strip disposed in aperture 227 and extending from connector ring 222 to the top of rocker-arm shoulder 228.

In operation, each rocker-arm 172 is rotatably movable about pivots 178 between an inactivated position, as shown in FIG. 16, and an activated position. Each push-button 170 is likewise movable between activated and inactivated positions; push-button 170 upon movement to said activated position causes rocker-arm 172 to be rotated to the activated position. In the inactivated position push-button outer portion 176 is distantly spaced from bottom 179 and pressing finger 195 is spaced above ring face 206 of column 190. During the inactivated mode, the record is in its contact mode with the stylus 20 described earlier with regard to FIGS. 1-15. Likewise, latch member 214 is out of latching contact with catch member 212 in the inactivated mode. In the activated mode, a selected push-button 170 with its associated rocker-arm 172 has been activated by a user wherein push-button outer portion 174 is spaced proximate to bottom wall 179, and shoulder 196 along with outer pressing finger 195 of rocker-arm 172 is moved inwardly from bottom wall 179 to a position more spaced from bottom wall 179 than was shoulder 196 in the inactivated mode, and latch member 214 is positioned in pocket 213, whereby column 190 is pressed downwards at ring face 206 by inner finger 209 of rocker-arm 172.

Each rocker arm 172 and push button 176 can be integral with the provision that the chute for push button 176 is sufficiently spacious to allow for some lateral movement of the push button. In particular, each rocker arm 172 and push button 176 can be integrally corrected (one-piece) at outer pressing finger 195 and shoulder 196, respectively.

The embodiment of this invention particularly disclosed and described hereinabove is presented merely as an example of the invention. Other embodiments, forms, and modifications of the invention coming within the proper scope and spirit of the appended claims will, of course, readily suggest themselves to those skilled in the art.

What is claimed is:
1. A system for selecting one message of a plurality of messages of equally spaced concentric spiral grooves on a phonographic disc and for playing the selected message, each said selected message having a starting point on the periphery area of the disc and a termination point at the center area of the disc, comprising:
 a housing having walls including a base wall forming a compartment,
 a shaft having one end perpendicularly secured to said base wall and an opposite end positioned in said compartment, speaker means mounted in said compartment, arm means rotatably secured to said housing and movable in an arc on an arm plane perpendicular to said shaft, said arm means being operatively connected to said speaker means, means for keeping said arm means aligned in said arm plane, record means including said disc axially mounted a said opposite end of said shaft and rotatably movable perpendicular to said shaft, said record means being axially movable relative to said shaft between contact and non-contact positions, wherein said contact position the disc is in operative contact with said pickup means and in said non-contact position the disc is spaced from said arm means, said record means including a cylindrical column axially mounted around said shaft, said column including a main column portion and a base column portion of greater diameter than said main column portion, said base column portion having a planar ring face transverse to said shaft extending outwardly relative to said shaft directed towards said main column portion, said arm means being movable between said starting point and said termination point of the disc during rotation of said record means in said contact position, said arm means being positioned at a certain periphery position in preparation for contact with said starting point of said selected message, drive means mounted in said compartment operatively connected to said record means for rotating said record means, a source of power for energizing said drive means, a plurality of selecting means equal in number to the number of messages on the disc, each of said plurality of selecting means being movable between inactivated and activated positions, any one of said plurality of selecting means adapted to be moved from said inactivated position to said activated position to initiate selection of said selected messages to be played wherein said record means is moved from said contact position to said non-contact position, each of said plurality of selecting means being aligned relative to starting points of associated messages and to said certain periphery position of said pickup means, said plurality of selecting means being a plurality of elements including push-buttons having opposed inner and outer button portions, said inner button portions being disposed in said housing and said outer button portions being spaced outwardly from said base wall, said push-buttons being movable generally parallel to said shaft for operation by a user at said outer button portion, said plurality of elements further including rotatable arms having opposed inner and outer arm portions radially disposed around said shaft at equal intervals, said push-buttons forming shoulders in said compartment, said arm outer portions being positioned at said shoulders, said elements further including flexible strands joining said upper portion of said push-buttons and said arm outer portions, said rotatable arms further including pressing fingers at said arm inner portions, wherein in said contact position of said record means said pressing fingers are axially spaced from said ring face of said column and are in pressing contact upon said ring face of said column during movement of said record means from said contact position to said non-contact position, said base wall forming a plurality of radial slots aligned with said elements and also forming a plurality of holes spaced radially outwardly from each of said slots, said holes being adapted to slidingly receive said push-buttons, means associated with said selecting means upon said base wall for holding said record means in said non-contact position, means for de-energizing said drive means upon said pickup means reaching said termination point of said message in said contact position of said record means during rotation of said record means, means associated with said record means for releasing said means for holding and thereupon releasing said record means from said non-contact position upon rotation of said record means to said activated selected means of said plurality of selecting means, first biasing means for pressing said record means from said non-contact position to said contact position upon release of said means for holding, second biasing means for pressing said plurality of selecting means towards said inactivated positions, wherein said record means is biased to said contact position with said starting point for said selected message being aligned with said certain position of said arm means.

2. A system according to claim 1, further including a plurality of flexible arms positioned in said slots and having radial inner and outer ends, said outer ends being secured to said bottom wall and said inner ends being movable in said slots, each of said flexible arms having a ramped projection at said inner end and also having a catch member spaced from said inner end, both said projection and said catch member extending into said compartment, said ramped projection being spaced from said ramped cam of said column when said column is in said contact position and being in the same plane with said ramped cam when said column is in said non-contact position, said arms being movable in said slots between non-flexed positions generally aligned with said base wall and flexed positions wherein said inner ends along with said ramped projections are spaced away from said bottom wall and said compartment.

3. A system according to claim 2, wherein said means for holding said record means in said non-contact position includes latch members on the underside of said rotatable arms of said elements positioned radially inwardly from said catch members relative to said shaft, said latch members including transverse portions ramped to transverse tips, said catch members including transverse projections ramped towards said shaft, said transverse projections and said flexible arms forming transverse pockets disposed radially outwardly from said transverse projections relative to said shaft, said transverse pockets being adapted to hold said transverse tips of said latch members when said element is in said activated position.

4. A system according to claim 3, wherein said speaker means includes a speaker cone having a beveled linear vertex positioned in said compartment and said means for keeping said arm means aligned in said arm plane is said linear beveled vertex aligned perpendicular to said arm plane of movement of said arm means said arc of movement between said certain periphery position to said center area of said disc and so positioned as to slidingly receive said arm means during rotation of said record means in said contact position.

5. A system according to claim 4, further including a support structure connected to said base wall having a planar top side spaced from said base wall and forming a central cavity axially aligned with said shaft and spaced around said column, said support structure forming a plurality of equally spaced radial slots extending outwardly from said cavity and opening along said planar top side, said support structure further forming a plurality of pivot recesses at said planar top side at each of said slots, said cavity being adapted to receive said base column portion of said column, the number of said slots being equal to the number of spiral grooves of said disc.

6. A system according to claim 5, wherein said rotatable arms include pivots, said rotatable arms being generally positioned in said radial slots and said pivots being rotatably positioned in said pivot recesses, each of said elements being rotatably movable about said pivots between said activated and said inactivated positions, said outer portions of said push-buttons having push-button ends; wherein in said inactivated positions said push-button ends are distantly spaced from said base wall, said pressing fingers are spaced above said ring face of said base column portion when said record means is in said contact position, and said latch members are out of contact with said catch members; and wherein in said activated position a selected one of said elements has been activated to wherein the push-button end of said selected element is spaced proximate to said base wall, the shoulder of the selected push-button along with said outer arm portion is moved to a position distantly spaced from said base wall, the pressing finger of said selected element is in pressing contact with said ring face of said column, and the transverse tip of the transverse portion of said selected element is positioned in the transverse pocket of the catch member of the associated flexible arm in latching relationship therewith.

7. A system according to claim 6, wherein said record means further includes a turntable axially connected at right angle to said main column portion of said column and said disc secured to said turntable, and said arm means includes an arm member having one end rotatably connected to said housing and an opposed free end movable over said arc and a stylus connected to said free end of said arm member, said stylus being aligned at said certain periphery position in preparation for contact with said starting point of said selected message, said push-buttons being aligned relative to said stylus at said certain periphery position and to the starting points of associated grooves of said plurality of messages.

8. A system according to claim 7, wherein said base column portion of said cylindrical column has a rim opposed to said rim face and further including a ramped cam extending axially outwardly from said rim of said base column portion, the ramp of said cam being aligned with the direction of rotation of said record means, and wherein when said record means is in said activated position, said ramped cam is capable of camming said ramped projection of said flexible arm associated with said selected activated element so as to bend said flexible arm and said catch member from said latched relationship with said rotatable member of said element, wherein said record means is biased to its contact position by said first biasing means.

9. A system according to claim 8, further including first stop means for limiting the movement of said arm member to a point wherein said stylus is positioned at the periphery of said record, said first stop means being associated with said arm member and said housing.

10. A system according to claim 9, wherein said first stop means includes said housing having a side wall, a first wing extending transversely from said arm member at said rotatably secured end, said housing including a side wall proximate to said secured end, said first wing being positioned against said side wall when said stylus is positioned over said periphery area of said disc.

11. A system according to claim 10, further including second stop means for limiting the movement of said arm member to a point wherein said stylus is positioned at the center area of said record, said second stop means being associated with said tone arm, said circuit control means, and said housing, said second control means being responsive to pressure from said second stop means so as to disconnect said power means upon said stylus reaching said center area of said disc.

12. A system according to claim 11, further including arm member biasing means for biasing said arm member from that position wherein said stylus is aligned at said central area of said disc to that position wherein said stylus is aligned at said periphery area of said disc.

13. A system according to claim 12, further including retainer pin means positioned at said secured end of said arm member and a projection including a receptacle extending from said housing, said pin means being secured to said receptacle, said arm member biasing means being a torsion spring mounted around said pin means, one arm of said torsion spring being secured to said arm member and another arm of said torsion spring being free and capable of being biased against said side wall of said housing when said stylus of said arm member moves from said periphery area to said center area.

14. A system according to claim 13, wherein said drive means is an electric motor and said source of power for energizing said drive means includes a source of electrical power and an electric circuit positioned in said housing connected to said source of electric power and said electric motor.

15. A system according to claim 14, further including circuit control means for electrically connecting and disconnecting said electric circuit upon response to pressure from said second stop means, said electric circuit being disconnected upon said stylus reaching the center area of said disc.

16. A system according to claim 15, further including control biasing means for moving said circuit control means from a disconnect position to a connect position.

17. A system according to claim 16, wherein said circuit control means includes an electrical rod connected to and extending from said housing into said compartment, an extension connected to and extending into said housing, a self-biasable electrical contact bar having a connected end and an opposite free end, said connected end being connected to said extension, and said free end being normally unbiased in electrical connection with said electrical rod, said electric circuit being connected to said electrical rod and to said connected end of said self-biasable contact bar.

18. A system according to claim 17, wherein said second stop means includes a second wing extending transversely from said tone arm opposite said first wing at said retainer pin means, said second wing being positioned against said free end of said contact bar so as to move said contact bar away from electrical contact with said electric rod when said stylus reaches said center position of said disc, said contact bar being in a biased mode, said stylus being pressed in said selected groove with sufficient force to withstand the biasing force of said contact bar.

19. A system according to claim 18, further including element biasing means secured to said support structure for moving said selected element from said activated position to said inactivated position upon release of the latch member of the selected rotatable arm from the pocket of the associated flexible arm.

20. A system according to claim 19, wherein said element biasing means includes a flat connector ring secured to said support structure around said shaft and a plurality of flat springs equal in number to said elements connected to and extending radially outwardly from said connector ring, central areas between said connector ring and said shoulders, said central areas being disposed on a plane generally perpendicular to said shaft nearer to said disc than the planes of said connector ring and said shoulders, each said flat spring being unbiased when an associated element is in said inactivated position and being biased when said associated element is in said activated position.

21. A system according to claim 20, wherein said first biasing means is a coiled compression spring disposed around said shaft.

22. A system according to claim 21, further including arm biasing means secured to said base wall of said housing for pressing said flexible arms to said non-flexed positions from said flexed positions.

23. A system according to claim 20 wherein said arm biasing means includes said base wall having an outer surface and wherein said arm biasing means includes a base ring support secured to said outer surface and a plurality of base flat springs equal in number with and disposed across said slots having one end directly over said flexible arms, each said flat spring having one end secured to said base ring support and an opposed free end, said base flat springs being unbiased when an associated flexible arm is in said non-flexed position and biased when said associated flexible arm is in said flexed position.

24. A system according to claim 4, further including a support structure connected to said base wall and having a planar inner side spaced from said base wall and forming a central cavity axially aligned with and spaced around said column, said support structure forming a plurality of equally spaced radial slots extending outwardly from said cavity and opening along said planar inner side, said support structure further forming a plurality of pivot recesses at said planar inner side at each of said slots, said cavity being adapted to receive said base column of said columns, the number of slots being equal to the number of the spiral grooves of said disc.

25. A system according to claim 24, wherein said rotatable arms include pivots, said rotatable arms being generally positioned in said radial slots and said pivots being rotatably positioned in said pivot recesses, each of said push-buttons being movable between activated and inactivated positions, and each of said rotatable arms being rotatably movable about said pivots by said push-buttons between said activated and said inactivated positions, said outer portions of said push-buttons having push-button ends; wherein in said inactivated positions said push-button ends are distantly spaced from said base wall with said pressing fingers spaced above said ring face of said base column portion when said record means is in said contact position and said latch members are out of contact with said catch members; and wherein in said activated position a selected one of said associated first and second elements has been activated to wherein the push-button end of said selected push-button is spaced proximate to said base wall, the shoulder of said selected push-button along with said outer arm portion is moved inwardly from said base wall, the pressing finger of said selected rotatable arm is in pressing contact with said ring face of said column, and the transverse tip of the transverse portion of said selected second element is positioned in the transverse pocket of the catch member of the associated flexible arm in latching relationship therewith.

26. A system according to claim 25, further including biasing means secured to said support structure for moving said selected associated first and second elements from said activated position to said inactivated position upon release of the latch member of the selected rotatable arms from the pocket of the associated flexible arm.

27. A system according to claim 26, wherein said biasing means includes a flat connector ring secured to said support structure around said shaft and a plurality of associated first and second flat springs equal in number to said associated first and second elements connected to and extending radially outwardly from said connector ring, said first flat springs extending from said connector ring to said push-buttons of said first elements, said push-buttons having U-rims at the top of said channels, said first flat springs being U-strips connected to said connector ring and contoured to be in contact with said U-rims, said U-strips forming elongated apertures with said connector ring, said rotatable arms of said second elements having second shoulders extending radially inwardly from said outer arm portions, said second flat springs being single strips disposed in said apertures and extending from said connector ring to be in contact with said second shoulders of said rotatable arms, said first and second flat springs being unbiased when said push-buttons and said rotatable arms are in said inactivated positions and being biased when a selected push-button and associated rotatable arm are in said activated position.

28. A system according to claim 25, wherein each of said plurality of push buttons and said plurality of rotatable arms are integral and made of one piece.

29. A system for selecting separately at a time one track having a message from a plurality of track having other messages registered in a plurality of equally spaced concentric spiral grooves on a phonographic disc and for playing the selected message, with each said selected message having a starting point on the periphery area of the disc comprising: a speaker and turntable means for said system; a housing having walls including a base wall forming a compartment; a shaft having one end perpendicularly secured to said base wall and an opposite end positioned in said compartment; a tone arm for tracking in a groove containing a desired predetermined message and power means for driving same; said turntable means being axially movable relative to said shaft between contact and non-contact positions, wherein in said contact position the disc is in operative contact with said tone arm and in said non-contact position the disc is spaced from said tone arm; and means for selecting any one of said spiral grooves by cooperatively associating each individual registered message on said spiral grooves with individual push-button selection means which function upon being moved between inactivated and activated positions, with any one of the activated positions engaging said tone arm at a predetermined groove disposed relative to one of the associated push-buttons of said push-button selection means, wherein said push-button selection means in said activated position releasably positions said turntable means away from said tone arm and said turntable means acts to release said push-button means from said activated position when said groove for said selected message is aligned with said tone arm; said turntable means including a cylindrical column axially mounted around said shaft, said column including a main column portion and a base column portion of greater diameter than said main column portion, said base column portion having a planar ring face transverse to said shaft extending outwardly relative to said shaft directed towards said main column portion, said base column portion having a rim opposed to said rim face; said push-button selecting means including a plurality of elements including push-buttons having opposed inner and outer button portions, said inner button portions being disposed in said housing and said outer button portions being spaced outwardly from said base wall, said push-buttons being movable generally parallel to said shaft for operation by a user at said outer button portions; said plurality of elements further including rotatable arms having opposed inner and outer arm portions radially disposed around said shaft at equal intervals, said push-buttons forming shoulders in said compartment, said arm outer portions being positioned at said shoulders, said plurality of elements further including flexible strands joining said upper portion of said push-buttons and said arm outer portions; said rotatable arms further including pressing fingers at said arm inner portions, wherein in said contact position of said turntable means said pressing fingers are axially spaced from said ring face of said column and are in pressing contact upon said ring face during movement of said record means from said contact position to said non-contact position; said base wall forming a plurality of radial slots aligned with said elements and also forming a plurality of holes spaced radially outwardly from each of said slots, said holes being adapted to slidingly receive said push-buttons.

30. The system according to claim 29, wherein the axial movement of said disc is achieved by bracing means beneath said disc being compressed by the button which is selected and depressed.

31. The system according to claim 29, wherein activation of any selected one of said buttons moves said turntable means to an associated starting point while said phonographic disc disposed on said turntable moves axially to a position out of contact with a needle on said tone arm and achieving the selected message by release of biasing means acting upon the underside of said phonographic disc and by camming means keying said starting point with said needle.

32. The system according to claim 29, wherein the engagement of said disc and said tone arm is achieved by biased movement of the disc to engagement with said tone arm at the activated position corresponding to the selected message 33. A system for selecting separately at a time one track having a message from a plurality of tracks having other messages registered in a plurality of equally spaced concentric spiral grooves on a phonographic disc and for playing the selected message, with each said selected message having a starting point on the periphery area of the disc comprising: a housing having walls including a base wall forming a compartment; a shaft having one end perpendicularly secured to said base wall and an opposite end positioned in said compartment; a speaker and turntable means for said system; a tone arm for tracking in a groove containing a desired predetermined message and power means for driving same; said turntable means being axially movable relative to said shaft between contact and non-contact positions, wherein in said contact position the disc is in operative contact with said tone arm and in said non-contact position the disc is spaced from said tone arm; and a plurality of means for selecting any one of said spiral grooves by cooperatively associating each individual registered message of said spiral grooves with individual selection means which function upon being moved between inactivated and activated positions, and with any one of the activated positions engaging said tone arm at a predetermined groove disposed relative to said individual selection means, wherein said plurality of selection means in said activated positions releasably positions said turntable means away from said tone arm and said turntable means acts to release said selection means from said activated positions when said groove for said selected message is aligned with said tone arm; said turntable means including a cylindrical column axially mounted around said shaft, said column including a main column portion and a base column portion of greater diameter than said main column portion, said base column portion having a planar ring face transverse to said shaft extending outwardly relative to said shaft directed towards said main column portion; said plurality of selecting means being a plurality of operatively cooperatively associated first and second elements, said first elements being push-buttons having opposed button inner and outer portions, said button inner portions being disposed in said housing and said button inner portions being disposed in said housing and said button outer portion being spaced outwardly from said base wall, said push-buttons being movable generally parallel to said shaft by operation by a user at said outer portion; wherein said second elements are rotatable arms having opposed arm inner and outer portions radially disposed around said shaft at equal intervals, said push-buttons forming first shoulders at said button inner portions, said arm outer portions being positioned at said first shoulders, said button inner portions forming channels defined by outer walls, pairs of opposite side walls connected to said outer walls and said shoulders, said channels having inner open sides formed opposite to said outer walls, said arm inner portions forming first pressing fingers slidably positioned in said channels; said rotatable arms including second pressing fingers at said arm portions, wherein in said contact position of said record means said pressing fingers are axially spaced from said ring face of said column and are in pressing contact upon said ring face of said column during movement of said record means from said contact position to said non-contact position; and wherein said base wall forms a plurality of radial slots aligned with said elements and also forms a plurality of holes spaced radially outwardly from each of said slots, said holes being adapted to receive said push-buttons.

34. A system for selecting one message of a plurality of messages of equally spaced concentric spiral grooves on a phonographic disc and for playing the selected message, each said selected message having a starting point on the periphery area of the disc and a termination point a the center area of the disc, comprising:

a housing having walls including a base wall forming a compartment, a shaft having one end perpendicularly secured to said base wall and an opposite end positioned in said compartment, speaker means mounted in said compartment, arm means rotatably secured to said housing and movable in an arc on an arm plane perpendicular to said shaft, said arm means being operatively connected to said speaker means, means for keeping said arm means aligned in said arm plane, record means including the disc axially mounted a said opposite end of said shaft and rotatably movable perpendicular to said shaft, said record means being axially movable relative to said shaft between contact and non-contact positions, wherein said contact position the disc is in operative contact with said pickup means and in said non-contact position the disc is spaced from said arm means, said record means including a cylindrical column axially mounted around said shaft, said column including a main column portion and a base column portion of greater diameter than said main column portion, said base column portion having a planar ring face transverse to said shaft extending outwardly relative to said shaft directed towards said main column portion, said arm means being movable between said starting point and said termination point of the disc during rotation of said record means in said contact position, said arm means being positioned at a certain periphery position in preparation for contact with said starting point of said selected message, drive means mounted in said compartment operatively connected to said record means for rotating said record means, a source of power for energizing said drive means, a plurality of selecting means equal in number to the number of messages on the disc, each of said plurality of selecting means being movable between inactivated and activated positions, any one of said plurality of selecting means adapted to be moved from said inactivated position to said activated position to initiate selection of said selected message to be played wherein said record means is moved from said contact position to said non-contact position, each of said plurality of selecting means being aligned relative to starting points of associated messages and to said certain periphery position of said pickup means, means associated with said selecting means upon said base wall for holding said record means in said non-contact position, means for de-energizing said drive means upon said pickup means reaching said termination point of said message in said contact position of said record means during rotation of said recorded means, means associated with said record means for releasing said means for holding and thereupon releasing said record means from said non-contact position upon rotation of said record means to said activated selected means of said plurality of selecting means, first biasing means for pressing said record means from said non-contact position to said contact position upon release of said means for holding, second biasing means for pressing said plurality of selecting means towards said inactivated positions, wherein said record means is biased to said contact position with said starting point for said selected message being aligned with said certain position of said arm means, said plurality of selecting means being a plurality of operatively cooperatively associated first and second elements, said first elements being push-buttons having opposed button inner and outer portions, said button inner portions being disposed in said housing and said button inner portions being disposed in said housing and said button outer portion being spaced outwardly from said base wall, said push-buttons being movable generally parallel to said shaft by operation by a user at said outer portion, wherein said second elements are rotatable arms having opposed arm inner and outer portions radially disposed around said shaft at equal intervals, said push-buttons forming first shoulders at said button inner portions, said arm outer portions being positioned at said first shoulders, said button inner portions forming channels defined by outer walls, pairs of opposite side walls connected to said outer walls and said shoulders, said channels having inner open sides formed opposite to said outer walls, said arm inner portions forming first pressing fingers slidably positioned in said channels, said rotatable arms including second pressing fingers at said arm inner portions, wherein in said contact position of said record means said pressing fingers are axially spaced from said ring face of said column during movement of said record means from said contact position to said non-contact position, and wherein said base wall forms a plurality of radial slots aligned with said elements and also forms a plurality of holes spaced radially outwardly from each of said slots, said holes being adapted to receive said push-buttons.

35. A system according to claim 34, wherein said base column portion of said cylindrical column has a rim opposed to said ring face; and further including a ramped cam extending axially outwardly from said rim of said base column portion, the ramp of said cam being aligned with the direction of rotation of said record means; and a plurality of flexible arms positioned in said slots and having radial inner and outer ends, said outer ends being secured to said bottom wall and said inner ends being movable in said slots, each of said flexible arms having a ramped projection at said inner end and also having a catch member spaced from said inner end, both said ramped projection and said catch member extending into said compartment, said ramped projection being spaced from said ramped cam of said column when said column is in said contact position and being in the same plane with said ramped cam when said column is in said non-contact position, said arms being movable in said slots between non-flexed positions generally aligned with said base wall and flexed positions wherein said inner ends along with said ramped projections are spaced away from said bottom wall and said compartment.

36. A system according to claim 35, wherein said means for holding said record means in said non-contact position includes latch members on the underside of said rotatable arms of said second elements positioned radially inwardly from said catch members relative to said shaft, said latch members including transverse portions ramped to transverse tips, said catch members including transverse projections ramped towards said shaft, said transverse projections and said flexible arms forming transverse pockets disposed radially outwardly from said transverse projections relative to said shaft, said transverse pockets being adapted to hold said transverse tips of said latch members when said first and second elements are in said activated position.

* * * * *